United States Patent [19]

Vincent de Paul et al.

[11] Patent Number: 5,150,736
[45] Date of Patent: Sep. 29, 1992

[54] VALVE WITH CRENELLATED SEAT

[75] Inventors: Michel Vincent de Paul, Senlis; Francois Detanne, Paris, both of France

[73] Assignee: GEC Alsthom SA, Paris, France

[21] Appl. No.: 759,281

[22] Filed: Sep. 13, 1991

[30] Foreign Application Priority Data

Sep. 13, 1990 [FR] France .................................. 9011337

[51] Int. Cl.⁵ ............................................. F16K 47/02
[52] U.S. Cl. ............................... 137/625.3; 137/625.37
[58] Field of Search ........... 137/625.3, 625.37, 625.38, 137/625.28, 630.13; 251/118, 123

[56] References Cited

U.S. PATENT DOCUMENTS

| | | | |
|---|---|---|---|
| 4,121,617 | 10/1978 | Masek et al. | 137/630.14 |
| 4,479,509 | 10/1984 | Dear et al. | 137/625.3 X |
| 4,705,071 | 11/1987 | Connors. Jr. et al. | |
| 4,892,118 | 1/1990 | Davies et al. | 137/625.3 |

FOREIGN PATENT DOCUMENTS 3138459  6/1982  Fed. Rep. of Germany .
3137687  4/1983  Fed. Rep. of Germany .

Primary Examiner—Martin P. Schwadron
Assistant Examiner—Kevin L. Lee
Attorney, Agent, or Firm—Sughrue, Mion, Zinn Macpeak & Seas

[57] ABSTRACT

A valve comprises a valve obturator cooperating with a valve seat provided with crenellations disposed around the part of the valve seat on which the valve obturator rests. Each crenellation comprises on its surface facing the valve obturator a vertical central partition between two symmetrical openings.

4 Claims, 3 Drawing Sheets

VALVE WITH CRENELLATED SEAT

BACKGROUND OF THE INVENTION

1. Field of the invention

The invention concerns valves and in particular stream turbine control valves.

2. Description of the prior art

These valves are used to control the flowrate of the steam to the turbine; at low flowrates the valve provides a small cross-section passage for the steam and because of pressure differences between the inlet and outlet sides of the valve supersonic speeds are produced near the area in which the valve obturator or closure into contact with the valve seat. Shockwaves and separation of the fluid from the valve walls can then occur and cause the valve to vibrate and an excessive noise level.

One solution to this problem is to divide the flow into a plurality of small jets. This can be achieved with a valve seat incorporating a throttling flange with slots in its circumference separating the throttling flange into crenellations as described, for example in French utility patent No 76 12647.

A number of large steam turbines throughout the world are equipped with such valves, but it has been found that some level of vibration persists under partial load conditions.

The valve in accordance with the invention for eliminating vibration under partial load conditions is characterized in that each crenellation comprises on its surface facing the valve obturator a vertical central partition between two symmetrical openings.

The symmetrical openings can be cells or chamfers.

The partition has a width between 1/10th and 1/5th the width of the crenellation.

The present invention will be better understood from the following description.

DETAILED DESCRIPTION OF THE INVENTION

Figure 1:
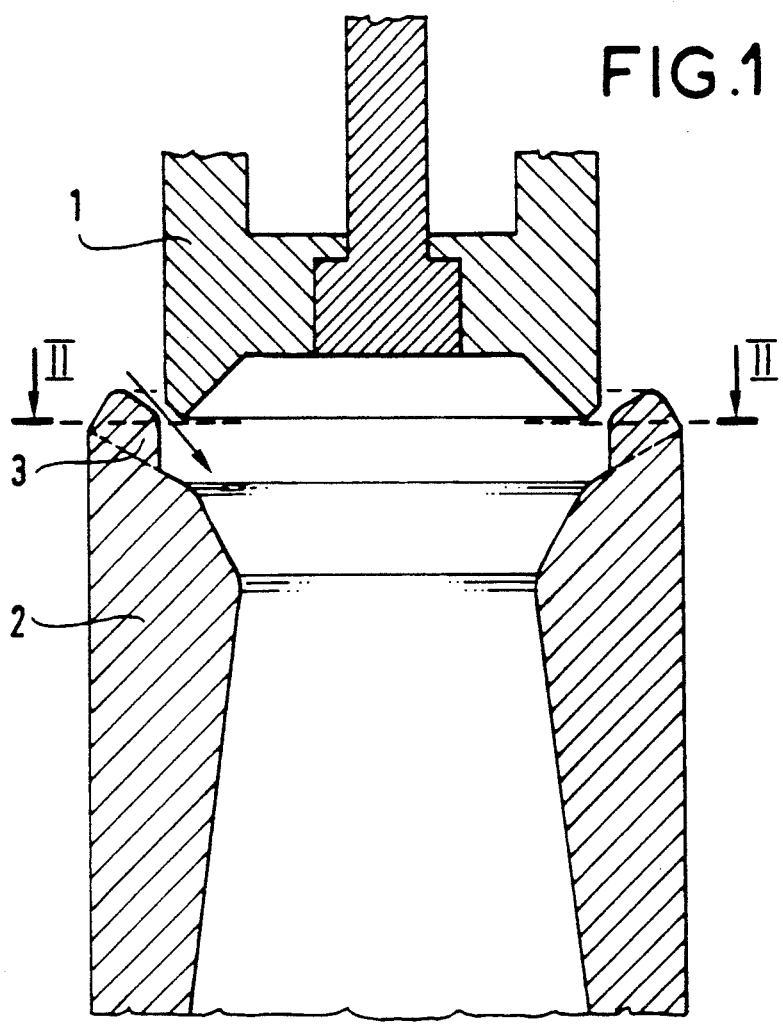
FIG. 1 shows a known valve.
Figure 2:
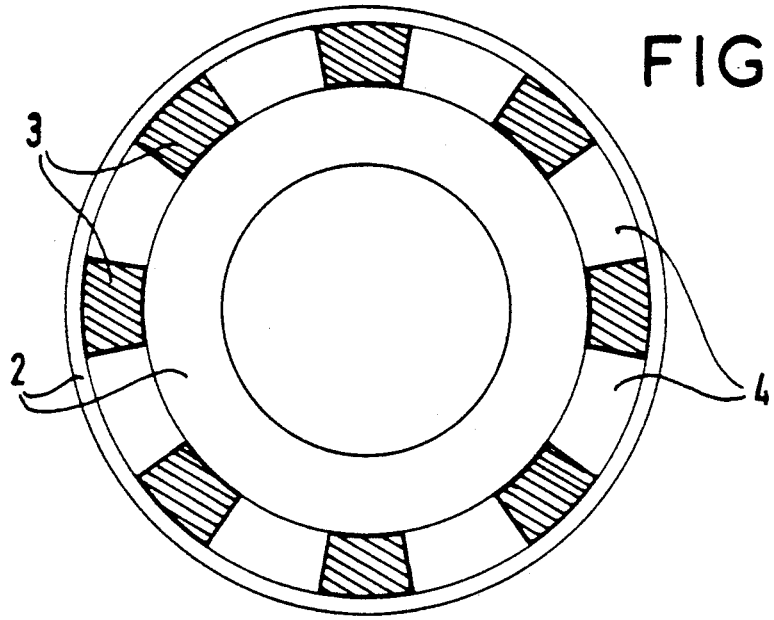
FIG. 2 shows the FIG. 1 valve in horizontal cross-section.

FIGS. 1 and 2 show a known valve which comprises a cylindrical valve obturator or closure 1 resting on valve seat 2. On this seat are crenellations 3 separated by slots 4. These circumferentially disposed and spaced crenellations 3 surround the valve obturator 1 when it rests on the valve seat 2.

Figure 3:
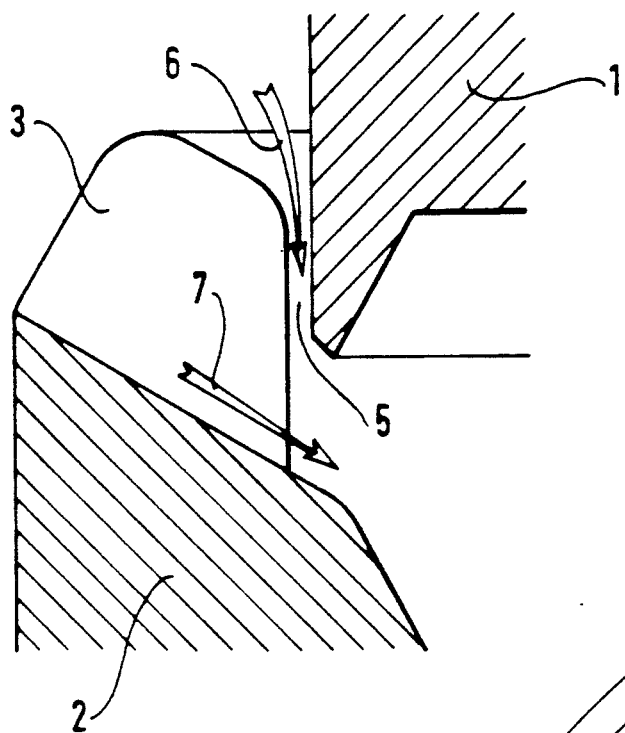
FIG. 3 shows the flow in the FIG. 1 valve.
Figure 4:
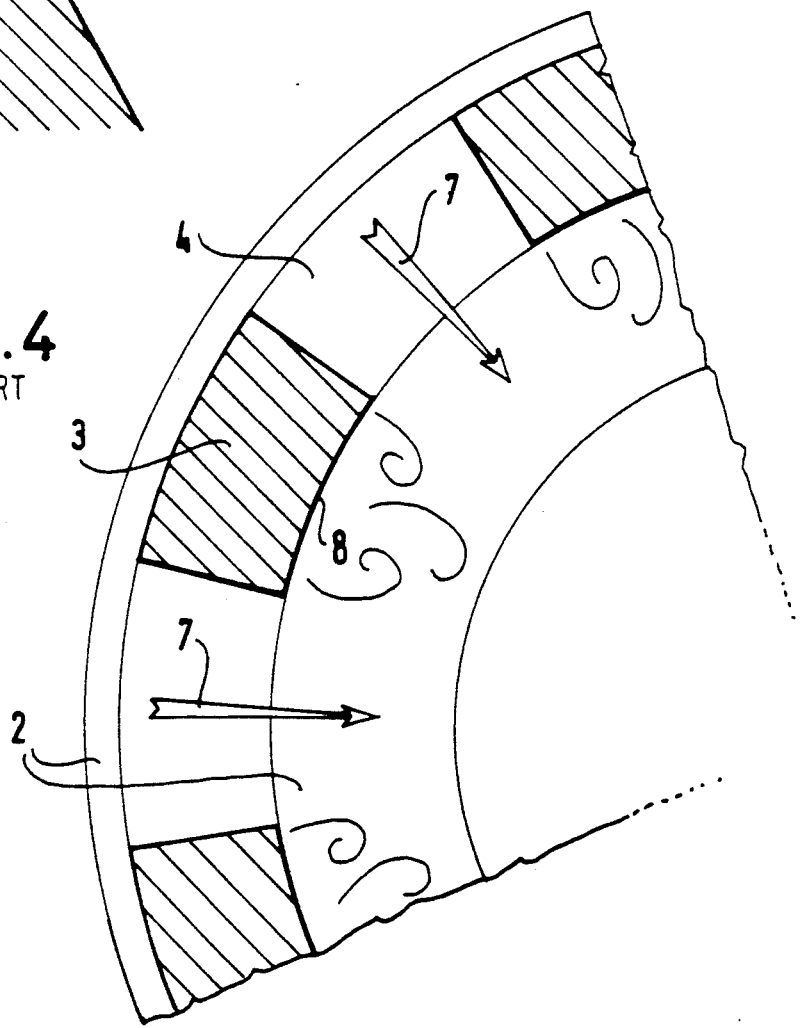
FIG. 4 shows the FIG. 3 valve in partial cross-section.

When the valve obturator is set to the mid-height of the crenellation (see FIGS. 3 and 4) a certain quantity of fluid 6 will pass through the passage between the valve obturator 1 and the crenellations 3 of the valve seat 2. The main part 7 of the flow passes through the slots 4.

On the downstream side of the crenellations 3 there will be an area of dead water which fluctuates because of asymmetrical separation of vortices from the two edges of the crenellation 3; this will cause a fluctuation in the pressure which will pass into the passage 5 to exert non-stationary forces on the valve obturator 1 and therefore cause vibration.

Figure 5:
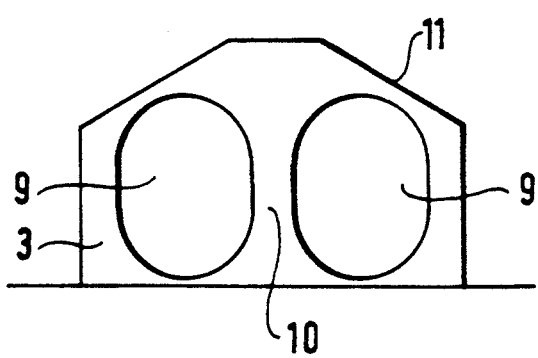
FIG. 5 shows a front view of one crenellation of a valve 3 in accordance with the invention.
Figure 6:
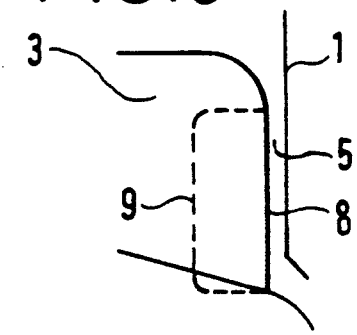
FIG. 6 is a side view of the crenellation from FIG. 5.

FIGS. 5 and 6 show a crenellation of the valve in accordance with the invention.

This crenellation 3 has on its radial surface 8 facing the cylindrical valve obturator 1 two cells 9 which are symmetrical to the median plane of the crenellation 3. The two cells 9 are separated by a central partition 10. Because of this partition 10, the dead water area does not fluctuate and so cause pressure fluctuations. This renders the detachment of the vortices symmetrical relative to the median plane of the crenellation.

The width of the partition 10 is between 1/10th and 1/5th the width of the crenellation 9.

The partition extends from the foot of the crenellation 3 up to the part at which the chamfered surfaces 11 topping the crenellation 3 begin.

Figure 7:
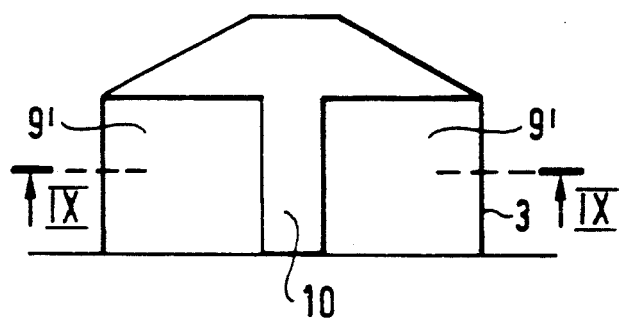
FIG. 7 shows a front view of an alternative embodiment of a crenellation of the valve seat in accordance with the invention.
Figure 8:
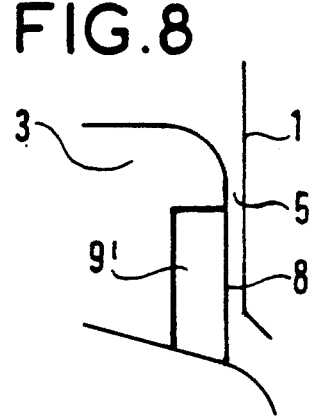
FIGS. 8 and 9 show a side view and a horizontal cross-section view of the FIG. 7 crenellation.
Figure 9:
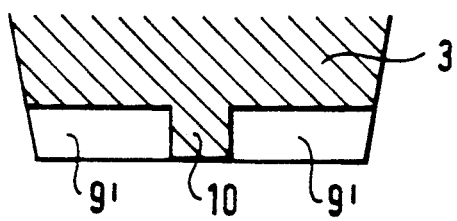
Figure 10:
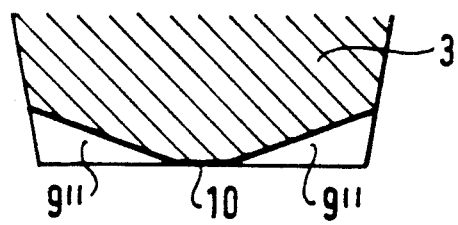
FIG. 10 shows a horizontal cross-section view of a further embodiment of a crenellation of the valve seat in accordance with the invention.

As an alternative, the cells 9 may be replaced with openings 9' discharging onto the lateral surfaces of the crenellation (FIGS. 7, 8, 9) or by chamfers 9" extending from the central partition 10 to such lateral surfaces to opposite sides thereof.

Wind tunnel tests show that the openings 9, 9', 9" eliminate virtually all valve vibration.

There is claimed:

1. Valve comprising a cylindrical valve obturator engagable with an annular valve seat provided with circumferentially spaced crenellations disposed around the part of the valve seat on which the valve obturator rests, wherein each crenellation comprises on a radial surface thereof facing the cylindrical valve obrutartor, an axially extending central partition and two symmetrical openings with said radial surface extending respectively towards opposite lateral surfaces of the crenellation.

2. Valve according to claim 1 wherein the openings are in the form of cells.

3. Valve according to claim 1 wherein the openings are chamfers extending from the partition to said opposite lateral surfaces of the crenellations.

4. Valve according to claim 1 wherein the width of the partition is between 1/10th and 1/5th the width of the crenellation.

* * * * *